(No Model.)

M. CULLEN.
AIR COMPRESSOR.

No. 307,442. Patented Nov. 4, 1884.

Witnesses
Albert H. Walker.
Morgan W. Beach.

Inventor.
Michael Cullen.

UNITED STATES PATENT OFFICE.

MICHAEL CULLEN, OF HARTFORD, CONNECTICUT.

AIR-COMPRESSOR.

SPECIFICATION forming part of Letters Patent No. 307,442, dated November 4, 1884.

Application filed April 16, 1883. (No model.)

*To all whom it may concern:*

Be it known that I, MICHAEL CULLEN, of Hartford, Connecticut, have invented a new and useful apparatus which I denominate a Hydraulic Oscillating Automatic Air-Compressor, of which the following description and claims constitute the specification, and which is illustrated by the accompanying drawings.

This apparatus is particularly adapted to create and maintain an artificial pressure of air in partially-empty beer-kegs; but it may also be used for other purposes. It receives its motive power from a hydrant, or from any other source of water-supply capable of furnishing water at a pressure of at least five pounds per square inch; and it ejects compressed air through a rubber tube or other proper connection into a beer-keg or other vessel where compressed air is wanted.

Figure 1:
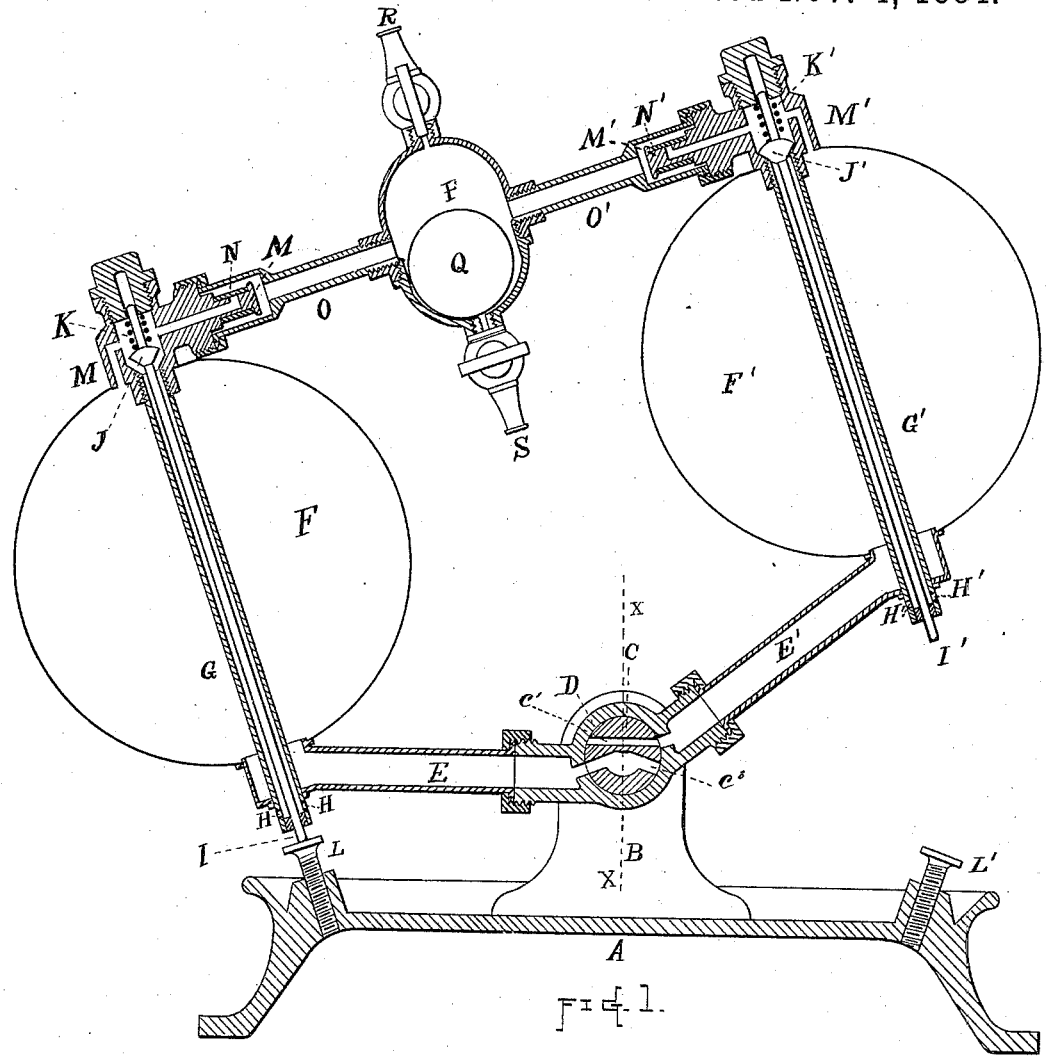
Figure 2:
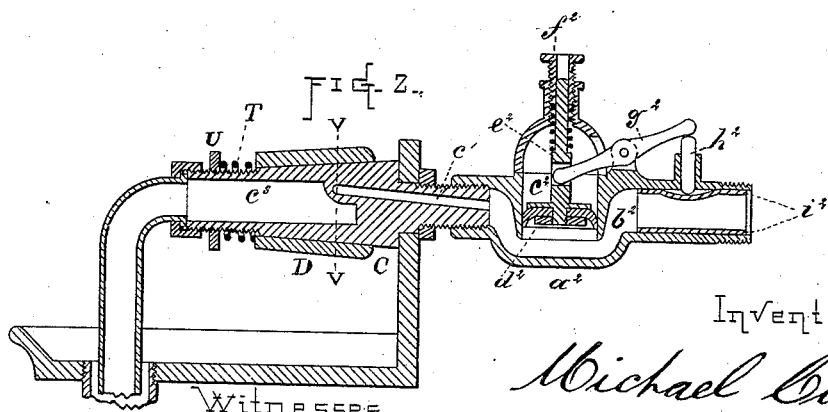

Figure 1 is a central vertical section of the main apparatus and of the stand which supports it, except that the tubes R and S and the lug B are shown in side view instead of in section. This vertical section is on the same plane with line $v\ v$ of Fig. 2. Fig. 2 is a central vertical cross-section on line $x\ x$ of Fig. 1, together with a like section of the pressure-regulator, which regulator is not shown in Fig. 1, because it is beyond the parts shown in section in that figure.

A is the supporting-stand, having the lug B projecting upward from its upper surface.

C is a plug which passes through that lug from front to rear, and is fastened thereto, so that it cannot revolve.

D is a shell which incloses the conical part of that plug C, and constitutes with it a four-way cock.

$c'$ is a T-shaped water-way bored in the plug. The body of that water-way appears in Fig. 2 and its cross appears in Fig. 1.

$c^3$ is another T-shaped water-way in the same plug, the body of which also appears in Fig. 2, and the cross of which also appears in Fig. 1. These two water-ways do not connect with each other.

T is a spiral spring between the shell D and the nut U. The function of that nut and that spring is to regulate the friction with which the shell D revolves upon the plug C, and also to readjust the shell to the plug whenever that friction is lessened by wear. This nut and spring may be dispensed with if the shell and plug are so made and managed as to require no regulation of friction after they are put together.

E E' are tubes which connect the two arms of the shell D to the hollow globes F F', respectively.

G G' are vent-tubes having inlet-holes H H H' H' and valve-rods I I', respectively. Those valve-rods have conical valves J J', fitted to sit in corresponding valve-seats, and forced to sit there by their weight and by the spiral springs K K', and sometimes by an artificial pressure of air, except when those valve-rods are forced up by concussion with the heads of the adjustable screws L L', respectively. The springs K K' may be omitted without materially affecting the operation or the utility of the apparatus. The screws L L' may also be omitted if the stand is substantially level, their only function being to furnish two surfaces of the same altitude for the rods I I' to strike upon when the apparatus oscillates.

M M' are shells, the smaller end of each of which is encircled by the rubber tubes N N', respectively.

O O' are tubes which connect those shells, respectively, with the shell P.

Q is a hollow spherical float loosely placed in the shell P.

R is a tube furnished with a cock and leading from the shell P to the beer-keg or other vessel where compressed air is wanted. The cock in the tube R may be omitted without affecting the ordinary operation of the apparatus. Its only function is an incidental one, hereinafter to be explained, and it is not necessary even for that function.

S is a tube furnished with a cock, the function of which is to drain the shell P and the tubes O O' whenever by accident any water finds its way into them.

The pressure-regulator consists of the shell $a^2$, one end of which is joined to that end of the plug C which is beyond the lug B, and the other end of which is joined to the hydrant or other source of water-supply.

$b^2$ is the water-way through the shell $a^2$, while $c^2$ is a cylinder in that shell above that water-way. That cylinder has a piston, $d^2$, working a piston-rod, $e^2$. A spiral spring encircles that piston-rod above a shoulder thereon, and below a tubular adjusting-screw, $f^2$, in which the upper end of that piston-rod works. That adjusting-screw is threaded into a tube which constitutes the upper projection of the cylinder $c^2$.

$g^2$ is a lever, one end of which is worked by its connection with the piston-rod, and the other end of which rests upon the upright follower $h^2$. That follower works in a tube which projects upward from the shell $a^2$. Inside that end of that shell is a rubber tube, $i^2$, the outer diameter of which is the same as the inner diameter of that end of that shell.

The apparatus is put in position to work by placing the stand A on any convenient level surface, and by connecting the right-hand end of the shell $a^2$ with the water-supply by means of a rubber tube or other proper conduit, and by similarly connecting the tube R with the vessel into which compressed air is to be forced, and by connecting the left-hand end of the plug C with any suitable conduit through which the waste water may pass away. One side of the main apparatus (the left-hand side, for example) is then oscillated downward by the hand till the valve-rod I rests upon the head of the screw L, thus lifting the valve J from its seat. The supply-water is then turned on and the apparatus will proceed to operate.

The mode of its operation is as follows: The water enters the shell $a^2$, passing through the rubber tube $i^2$ into the water-way $b^2$. Thence it passes into the body of the water-way $c'$, and thence into the cross of that water-way. It cannot pass out of the left-hand arm of that cross, because the end of that arm does not, in the existing position of the apparatus, communicate with any aperture. The water does, however, pass from the right-hand end of that cross into the tube E' and thence into the globe F'. As it rises in that globe, it drives the air before it into the shell M'. Reaching the smaller end of that shell, the forced air comes in contact with the inside of the rubber tube N'. That tube, being elastic, thereupon expands and allows the forced air to escape through its ends into the tube O'. Thence it passes into the shell P and the tube O. At the end of that tube the rubber tube N acts as a valve and arrests its further progress in that direction. The cock in the tube S being closed and that in the tube R being open, the air has no outlet save into the conduit which leads to the vessel where compressed air is wanted. As the water continues to rise in the globe F', the condensation of air progresses till the globe is nearly full of water. Thereupon the weight of that water overcomes the friction with which the plug C holds the shell D from revolving upon it, and in so overcoming that friction that weight causes the right-hand side of the main apparatus to fall and the left-hand side to rise. As the right-hand side falls, the valve-rod I' strikes on the head of the screw L', and thus forces the valve J' out of its seat. Being forced, however, against the pressure of the compressed air in the shell M', and also against the pressure of the spring K', the jar of the concussion is taken by those pressures, and is not hurtfully communicated to the body of the apparatus. The falling of the right-hand side of the main apparatus brings the tube E' into alignment with the right-hand arm of the water-way $c^3$, and also carries the left-hand arm of that water-way out of connection with the tube E, and also, by raising the valve J', admits external air into the globe F' through the vent-tube G' and its holes H' H'. Gravity will thereupon empty the globe F' of its water, that water passing away through the tube E', the water-way $c^3$, and the waste-conduit attached to the plug C. While that water is thus running away, the supply-water, having been diverted by the oscillation of the apparatus from the right-hand to the left-hand end of the cross of the water-way $c'$, passes from the latter into the tube E, and thereupon causes the same results in the left-hand side of the apparatus as those it formerly caused in the right-hand side. That supply-water also operates in the same way to force compressed air into the tube R, except that the rubber tube N has now the same operation and function that the rubber tube N' had before, and also vice versa. So, also, when the globe F becomes nearly full of water, the left-hand side of the apparatus falls and the right-hand side rises, whereupon the left-hand side parts with its water through the tube E and the water-way $c^3$, and the right-hand side repeats its former operation of receiving supply-water and compressing and ejecting air. The apparatus continues thus to automatically oscillate and work till the pressure of air in the vessel to which it is sent reaches the same degree as that which characterizes the pressure of the water in the water-way $b^2$. Then the apparatus will stop till that pressure of air is reduced to a degree lower than that pressure of water, when the apparatus will work again. It will thus continue to maintain an equilibrium between that pressure of air and that pressure of water.

The function of the pressure-regulator is to so adjust that pressure of water that the apparatus will produce and maintain any desired degree of pressure of air not greater than the pressure of water as it comes from the water-supply. If, for example, a pressure of fifteen pounds is wanted in a beer-keg, and if the water-supply varies in pressure from fifteen pounds upward, the screw $f^2$ may adjust the spiral spring below it to such a tension as that more than fifteen pounds of pressure in the water-way $b^2$ will force the piston $d^2$ up into the cylinder $c^2$, and in so doing will work the lever $g^2$, and thus depress the follower $h^2$. That follower will thereupon compress the middle part of the upper wall of the rubber tube down upon its lower wall, and thus stop the flow of water through that tube. As soon, however, as the pressure of air is lessened in the vessel to which compressed air is sent, the pressure of water will be correspondingly lessened in the water-way $b^2$, and the regulator will open the rubber tube $i^2$ and admit more water.

The pressure-regulator may be dispensed with if the user of the apparatus is content to have the pressure of air always agree with the greater or less varying or unvarying pressure of water as it comes from the water-supply.

The pressure-regulator is not claimed in this specification, because I purpose to make it the subject of a separate application for Letters Patent.

The function of the float Q is to prevent any water from being forced through the tube R and thence into the vessel containing compressed air, in case a person should hold the empty side of the apparatus down, and thus prevent its appointed oscillation. In the event of such an accident, when the upper globe becomes full, the water will pass into the shell M or M', as the case may be, and thence into the shell P through the intervening tube. In that shell it will cause the float to rise and close the opening which leads into the tube R. Thereupon the apparatus will stop and will force no more air into the vessel receiving it till the shell P and the tubes O O' are emptied of water. That emptying may thereupon be done by opening the cock in the tube S and oscillating the apparatus by hand, provided air-pressure enough to expel the water is introduced into the shell P. That pressure may be introduced by removing the tube R from its connection with the vessel to which compressed air is being sent, if the entrance to that vessel is furnished with a check-valve to prevent the egress of compressed air. If it is not furnished with such a valve, then the compressed air in that vessel will furnish pressure to vent the shell P. If it is undesirable to use the compressed air for that purpose, the cock in the tube R may be shut before that in the tube S is opened, and a special vent-cock may be attached to the shell P, to be opened only for the special purpose in hand.

The shell P, float Q, and tube S, with its cock, may be omitted if the apparatus is so protected from meddlers and from accident as that no water can reach the tubes O O'. In that case those tubes may be one tube, with the tube R branching therefrom.

I claim as my invention—

1. A four-way cock consisting of the plug C and the shell D, both constructed and operating together substantially as described.

2. A valve consisting of a rubber tube, N, encircling a shell, M, and within a tube, O, united to that shell, substantially as described.

MICHAEL CULLEN.

Witnesses:
ALBERT H. WALKER,
MORGAN W. BEACH.